United States Patent
Martinez Torres et al.

(10) Patent No.: US 12,422,030 B1
(45) Date of Patent: Sep. 23, 2025

(54) TURBINE HUB OF A TORQUE CONVERTER

(71) Applicant: Schaeffler Technologies AG & Co. KG, Herzogenaurach (DE)

(72) Inventors: Jorge Arturo Martinez Torres, Wooster, OH (US); William Norton, Fairview Park, OH (US); Natalie Allen, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/809,435

(22) Filed: Aug. 20, 2024

(51) Int. Cl.
*F16H 45/02* (2006.01)

(52) U.S. Cl.
CPC ....... *F16H 45/02* (2013.01); *F16H 2045/021* (2013.01)

(58) Field of Classification Search
CPC .................. F16H 45/02; F16H 2045/021
See application file for complete search history.

(56) References Cited

U.S. PATENT DOCUMENTS

| | | | | |
|---|---|---|---|---|
| 6,814,202 B1* | 11/2004 | Johann | ..................... | F16H 41/24 192/113.32 |
| 7,028,820 B2* | 4/2006 | Johann | ..................... | F16H 45/02 192/3.3 |
| 8,708,116 B2* | 4/2014 | Miyahara | .............. | F16F 15/145 192/55.61 |
| 9,188,212 B2 | 11/2015 | Vanni et al. | | |
| 10,451,158 B2 | 10/2019 | Vanni et al. | | |
| 11,371,595 B2* | 6/2022 | Lindemann | ............. | F16H 45/02 |
| 11,421,768 B1* | 8/2022 | Flores | ..................... | F16H 45/02 |
| 11,821,502 B1* | 11/2023 | Garcia | .................... | F16H 45/02 |
| 11,846,345 B1 | 12/2023 | Martinez Torres | | |
| 11,852,227 B1* | 12/2023 | Goodwill | ................ | F16H 45/02 |
| 2005/0211523 A1* | 9/2005 | Takahashi | ............... | F16H 45/02 192/3.29 |
| 2007/0068759 A1* | 3/2007 | Koppitz | .................. | F16H 45/02 192/3.3 |
| 2009/0283376 A1* | 11/2009 | Degler | .............. | F16F 15/12353 192/3.28 |
| 2011/0120829 A1* | 5/2011 | Vanni | ...................... | F16H 45/02 403/34 |
| 2017/0002908 A1* | 1/2017 | Saka | ........................ | F16H 41/24 |
| 2020/0393018 A1* | 12/2020 | Watanabe | ......... | F16F 15/12306 |
| 2021/0140525 A1* | 5/2021 | Adams | .................. | H02K 11/225 |
| 2022/0316569 A1* | 10/2022 | Mori | ....................... | F16H 45/02 |

* cited by examiner

Primary Examiner — Farhana Pervin
(74) Attorney, Agent, or Firm — Price Heneveld LLP (57) ABSTRACT

A torque converter a cover arranged to receive torque for rotation about an axis; an impeller non-rotatably connected to the cover; a lock-up clutch including a piston; a turbine that includes a turbine shell and a turbine hub, the turbine hub comprising: a first plate to which the turbine shell is non-rotatably connected; a second plate axially adjacent to the first plate and non-rotatably connected thereto, the second plate defining a plurality of apertures that are circumferentially offset from each other; and a third plate non-rotatably connected to the second plate and positioned axially adjacent thereto, such that the second plate is positioned axially between the first and third plates, the third plate defining a plurality of ports that are circumferentially offset from each other and are aligned with the corresponding plurality of apertures defined by the second plate.

17 Claims, 6 Drawing Sheets

TURBINE HUB OF A TORQUE CONVERTER

FIELD OF THE DISCLOSURE

The present disclosure generally relates to torque converters. More specifically, the present disclosure relates to a turbine hub of a torque converter.

BACKGROUND OF THE DISCLOSURE

Torque converters can include cross-flow hubs, in various implementations.

SUMMARY OF THE DISCLOSURE

According to a first aspect of the present disclosure, a torque converter includes a cover arranged to receive torque for rotation about an axis, an impeller non-rotatably connected to the cover, a lock-up clutch including a piston, and a turbine that includes a turbine shell and a turbine hub. The turbine hub includes a first plate to which the turbine shell is non-rotatably connected, a second plate axially adjacent to the first plate and non-rotatably connected thereto, and a third plate non-rotatably connected to the second plate and positioned axially adjacent thereto, such that the second plate is positioned axially between the first and third plates. The second plate defines a plurality of apertures that are circumferentially offset from each other. The third plate defines a plurality of ports that are circumferentially offset from each other and are aligned with the corresponding plurality of apertures defined by the second plate. The torque converter further includes a seal plate that is non-rotatably connected with the third plate, an apply chamber bounded at least in part by the piston, and a release chamber bounded at least in part by the seal plate and the piston. In a lock-up mode of the torque converter, in which the piston is non-rotatably connected to the cover, pressurized fluid is arranged to flow along a first flow path between the second and third plates and into the apply chamber to apply a force to the piston in a first axial direction. In a torque converter mode of the torque converter, in which the cover is rotatable with respect to the piston, pressurized fluid is arranged to flow along a second flow path between the first and second plates, into the plurality of apertures defined by the second plate, into the corresponding plurality of ports defined by the third plate, and into the release chamber to apply a force to the piston in a second axial direction opposite the first axial direction to disconnect the piston from the cover.

Embodiments of the first aspect of the disclosure can include any one or a combination of the following features:
the turbine shell is welded to the first and second plates, and the first plate is welded to the second plate;
at least one of the second plate includes an annular projection that extends about at least one of the plurality of apertures defined by the second plate, and the third plate includes an annular projection that extends about at least one of the plurality of ports defined by the third plate, wherein second and third plates are projection welded to each other at the annular projection of at least one of the second plate and the third plate;
the second plate includes the annular projection;
the third plate includes an inboard axial portion that extends in the second axial direction to a radial portion of the third plate that extends radially outboard from the inboard axial portion to an outboard axial portion of the third plate that extends in the first axial direction to the seal plate;
the inboard axial portion of the third plate is welded to the seal plate, the radial portion of the third plate defines the plurality of ports, and the outboard axial portion of the third plate cooperates with the seal plate to defines a plurality of openings through which the pressurized fluid flows away from the plurality of ports toward the release chamber in the torque converter mode of the torque converter;
the inboard axial portion includes an engagement interface that is configured to non-rotatably engage a shaft; and
a sealing element extends radially between the third plate and the piston such that the release chamber is isolated from the apply chamber.

According to a second aspect of the present disclosure, a turbine hub for a torque converter that is configured to rotate about an axis includes a first plate, a second plate, and a third plate. The second plate is axially adjacent to the first plate and non-rotatably connected thereto. The second plate further defines a plurality of apertures that are circumferentially offset from each other. The third plate is non-rotatably connected to the second plate and positioned axially adjacent thereto, such that the second plate is positioned axially between the first and third plates. The third plate defines a plurality of ports that are circumferentially offset from each other and are aligned with the corresponding plurality of apertures defined by the second plate.

Embodiments of the second aspect of the disclosure can include any one or a combination of the following features:
the first plate is welded to the second plate, and the first and second plates are configured to be welded to a turbine shell;
at least one of the second plate includes a projection that extends about at least one of the plurality of apertures defined by the second plate, and the third plate includes a projection that extends about at least one of the plurality of ports defined by the third plate, wherein second and third plates are projection welded to each other at the projection of at least one of the second plate and the third plate;
the second plate includes the projection;
the third plate includes an inboard axial portion that extends in the second axial direction to a radial portion of the third plate that extends radially outboard from the inboard axial portion to an outboard axial portion of the third plate that extends in the first axial direction to a seal plate;
the inboard axial portion of the third plate is welded to the seal plate, the radial portion of the third plate defines the plurality of ports, and the outboard axial portion of the third plate cooperates with the seal plate to defines a plurality of openings; and
the inboard axial portion includes an engagement interface that is configured to non-rotatably engage a shaft.

According to a third aspect of the present disclosure, a torque converter includes a cover arranged to receive torque for rotation about an axis, an impeller non-rotatably connected to the cover, a lock-up clutch including a piston, and a turbine that includes a turbine shell and a turbine hub. The turbine hub includes a first plate to which the turbine shell is non-rotatably connected, a second plate axially adjacent to the first plate and non-rotatably connected thereto, and a third plate non-rotatably connected to the second plate and positioned axially adjacent thereto, such that the second plate is positioned axially between the first and third plates. The second plate defines a plurality of apertures that are circumferentially offset from each other. The third plate defines a plurality of ports that are circumferentially offset from each other and are aligned with the corresponding plurality of apertures defined by the second plate. The torque converter further includes a seal plate that is non-rotatably connected with the third plate.

Embodiments of the third aspect of the disclosure can include any one or a combination of the following features:
- the turbine shell is welded to the first and second plates, and the first plate is welded to the second plate;
- at least one of the second plate includes an annular projection that extends about at least one of the plurality of apertures defined by the second plate, and the third plate includes an annular projection that extends about at least one of the plurality of ports defined by the third plate, wherein second and third plates are projection welded to each other at the annular projection of at least one of the second plate and the third plate;
- an apply chamber bounded at least in part by the piston, and a release chamber bounded at least in part by the seal plate and the piston; wherein, in a lock-up mode of the torque converter, in which the piston is non-rotatably connected to the cover, pressurized fluid is arranged to flow along a first flow path between the second and third plates and into the apply chamber to apply a force to the piston in a first axial direction; and wherein, in a torque converter mode of the torque converter, in which the cover is rotatable with respect to the piston, pressurized fluid is arranged to flow along a second flow path between the first and second plates, into the plurality of apertures defined by the second plate, into the corresponding plurality of ports defined by the third plate, and into the release chamber to apply a force to the piston in a second axial direction opposite the first axial direction to disconnect the piston from the cover; and
- the third plate includes an inboard axial portion that extends in the second axial direction to a radial portion of the third plate that extends radially outboard from the inboard axial portion to an outboard axial portion of the third plate that extends in the first axial direction to the seal plate, and wherein the inboard axial portion of the third plate is welded to the seal plate, the radial portion of the third plate defines the plurality of ports, and the outboard axial portion of the third plate cooperates with the seal plate to defines a plurality of openings through which the pressurized fluid flows away from the plurality of ports toward the release chamber in the torque converter mode of the torque converter.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis. The term "circumferential" and derivatives thereof, such as "circumferentially," shall be understood in relation to the axis of the aforementioned shaft.

As used herein, "non-rotatably connected" elements shall be understood to refer to elements that are connected such that whenever one of the elements rotates about the axis, all of the elements rotate about the axis at a common rate of rotation, and relative rotation between the elements is restricted.

Figure 1:
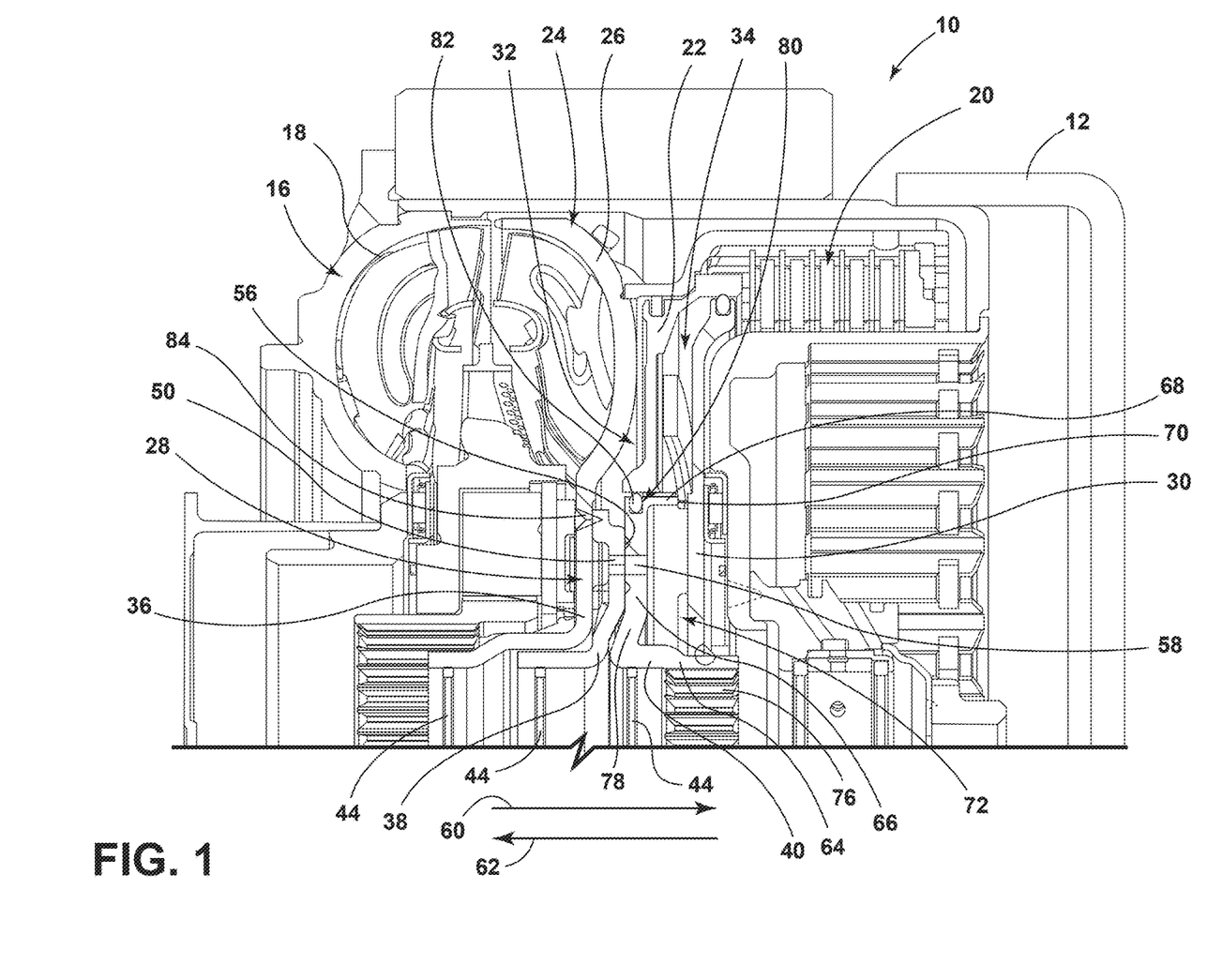
FIG. 1 is a partial cross-sectional view of a torque converter that includes a turbine hub configured for cross-flow of fluid to apply and release chambers, according to one embodiment.

Referring now to FIGS. 1-6, a torque converter 10 includes a cover 12 that is arranged to receive torque for rotation about an axis 14. An impeller 16 is non-rotatably connected to the cover 12. The impeller 16 can include an impeller shell 18, in various embodiments. The torque converter 10 includes a lock-up clutch 20. The lock-up clutch 20 includes a piston 22, such as a piston plate. A turbine 24 includes a turbine shell 26 and a turbine hub 28. The turbine shell 26 is non-rotatably coupled with the turbine hub 28. A seal plate 30 is non-rotatably connected with the turbine hub 28. The torque converter 10 includes an apply chamber 32 that is bounded at least in part by the piston 22 and a release chamber 34 that is bounded at least in part by the seal plate 30, as illustrated in FIG. 1.

Figure 2:
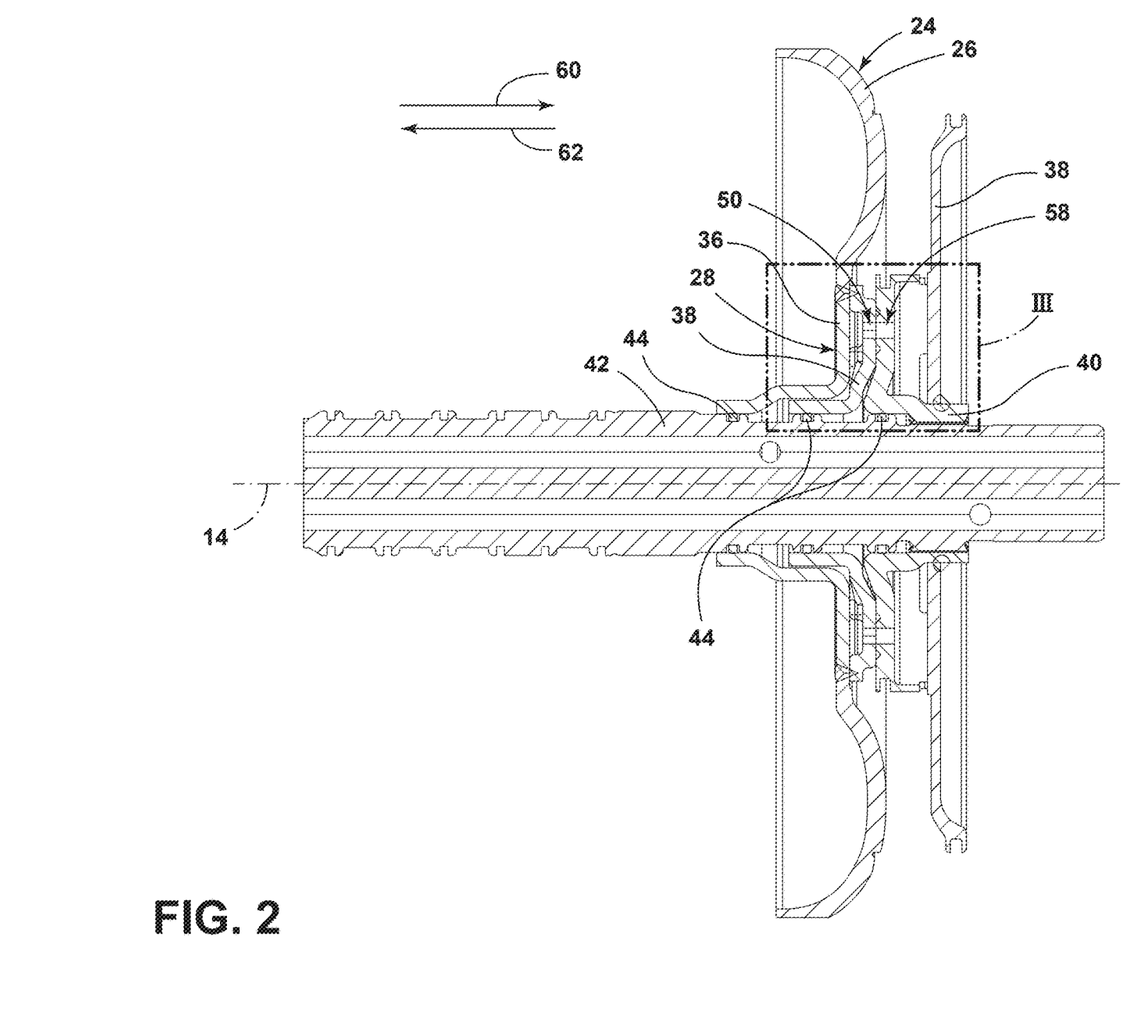
FIG. 2 is a partial cross-sectional view of a portion of a torque converter, illustrating a turbine hub having first, second, and third plates arranged on a shaft, a turbine shell coupled to the first plate, a seal plate coupled to the third plate, and a piston that partially defines an apply chamber and a release chamber, according to one embodiment.
Figure 3:
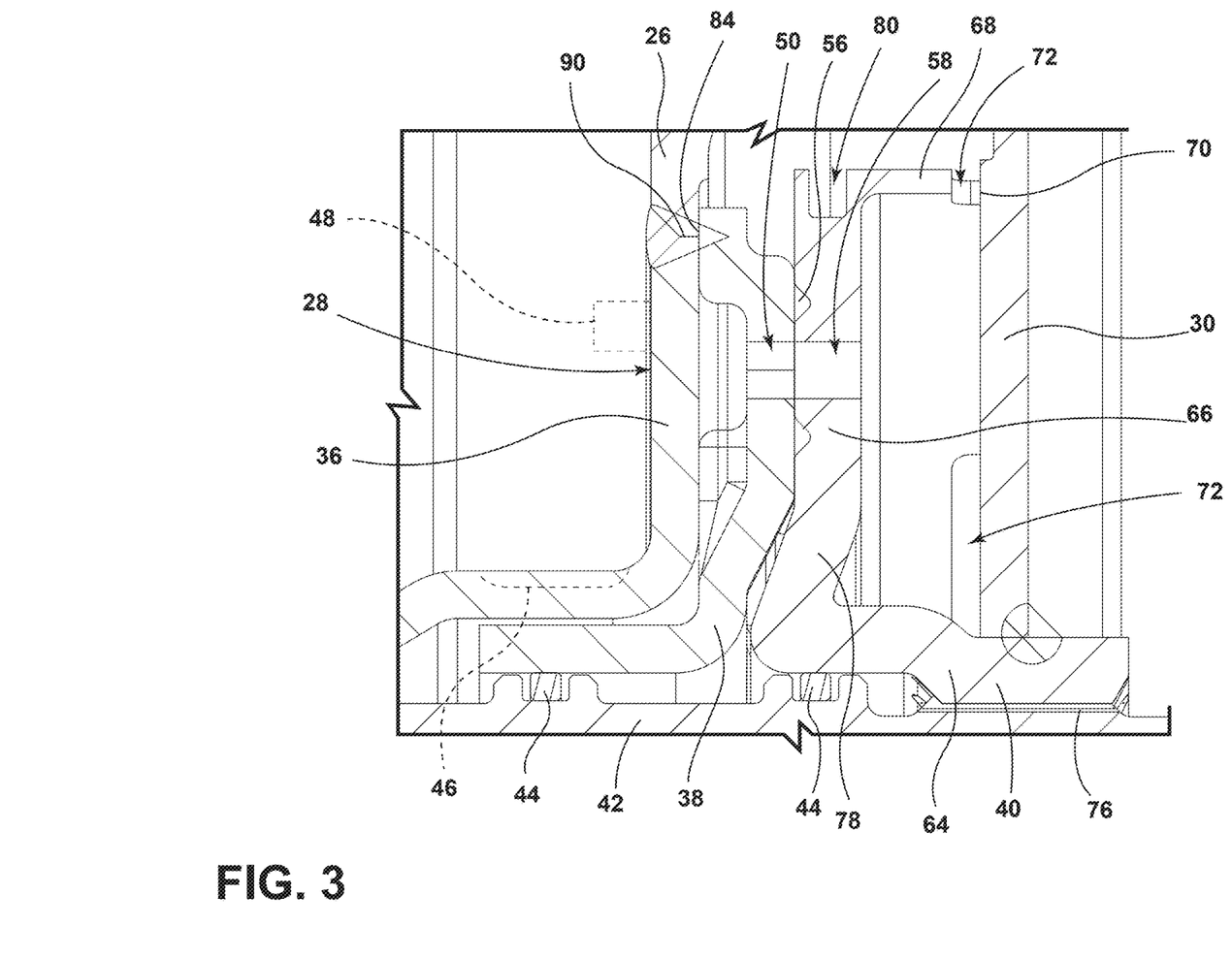
FIG. 3 is an enlarged view of area III of FIG. 2, illustrating the first, second, and third plates of the turbine hub, according to one embodiment.

Referring now to FIGS. 1-4, the turbine hub 28 of the turbine 24 can include a first plate 36, a second plate 38, and a third plate 40. The second plate 38 may be positioned axially adjacent to the first plate 36 and may be non-rotatably connected to the first plate 36, in various embodiments. The third plate 40 may be non-rotatably connected to the second plate 38 and positioned axially adjacent to the second plate 38, such that the second plate 38 is positioned axially between the first and third plates 36, 40. As illustrated in FIG. 2, each of the first, second, and third plates 36, 38, 40 extends about a shaft 42 of the torque converter 10. As illustrated, respective seals 44 interface with each of the first, second, and third plates 36, 38, 40 and the shaft 42. In some implementations, a thrust washer (not shown) is assembled with the first plate 36 of the turbine hub 28. The first plate 36 may include a plurality of circumferentially offset grooves 46, and/or a plurality of circumferentially offset stamped rivets 48, as illustrated in FIGS. 2 and 3, to allow for assembly of the thrust washer with the first plate 36.

Figure 4:
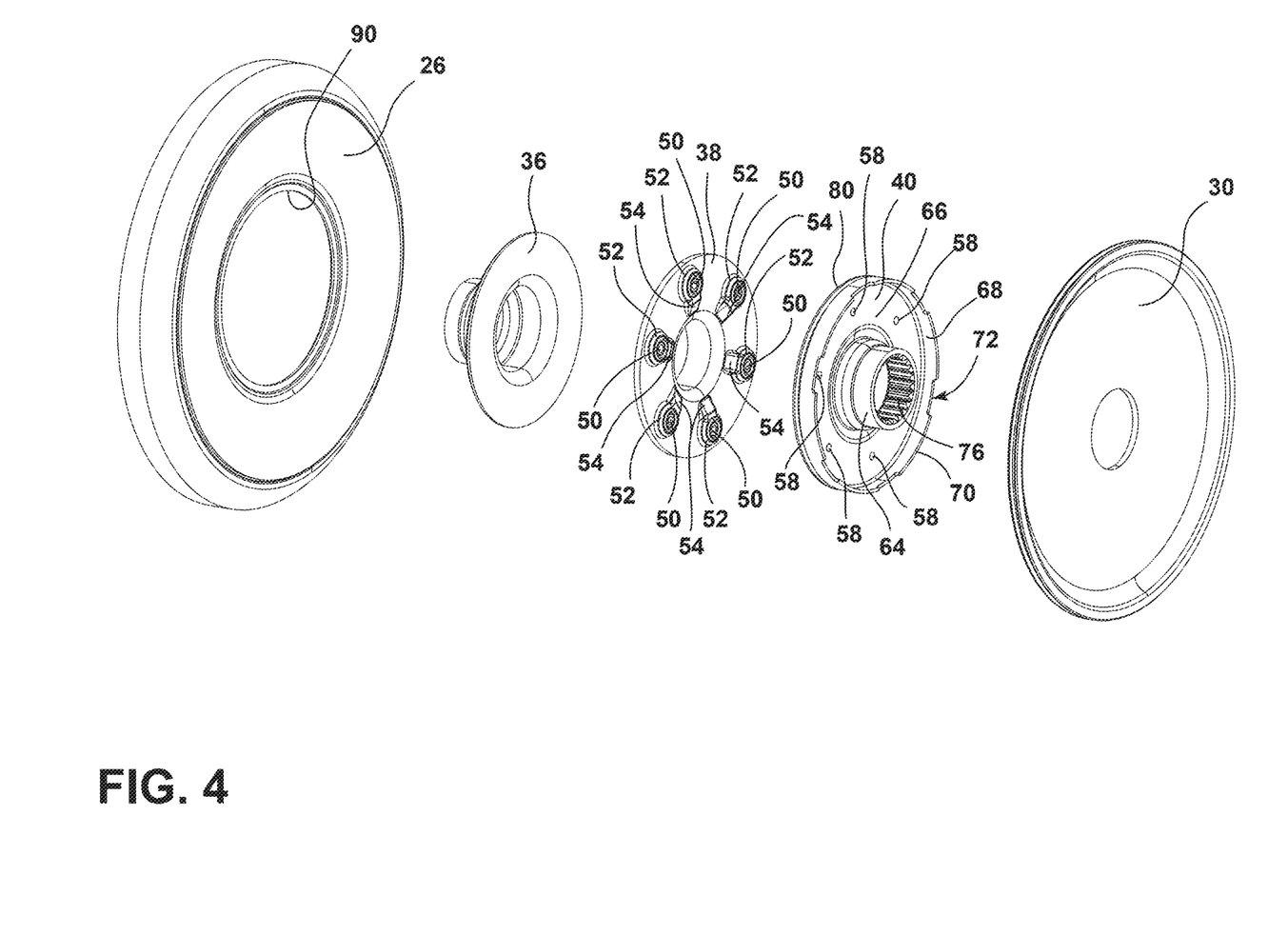
FIG. 4 is an exploded perspective view of a turbine, illustrating a turbine shell, a first plate of a turbine hub, a second plate of a turbine hub, a third plate of a turbine hub, and a seal plate, according to one embodiment.

Referring still to FIGS. 1-4, in various implementations, the second plate 38 defines a plurality of apertures 50. The plurality of apertures 50 may be circumferentially offset from each other, as illustrated exemplarily in FIG. 4. In some embodiments, the side of the second plate 38 that faces the third plate 40 may include a plurality of protruding portions 52 that respectively surround the plurality of apertures 50 defined by the second plate 38. As illustrated in FIG. 4, in various implementations, the protruding portions 52 may include ramped sections 54. The ramped sections 54 may interface with the third plate 40, as described further herein. In some implementations, the second plate 38 includes an annular projection 56 that extends about at least one of the plurality of apertures 50. For example, in the embodiment illustrated in FIGS. 3 and 4, the second plate 38 includes a plurality of annular projections 56 that respectively extend about the corresponding plurality of apertures 50 defined by the second plate 38.

Referring still to FIGS. 1-4, the third plate 40 can include a plurality of ports 58. The plurality of ports 58 may be circumferentially offset from each other, as illustrated exemplarily in FIG. 4. In various embodiments, the second and third plates 38, 40 are positioned relative to each other, such that the plurality of ports 58 defined by the third plate 40 are aligned with the corresponding plurality of apertures 50 defined by the second plate 38. For example, as illustrated in FIG. 3, the aperture 50 of the second plate 38 is aligned with the port 58 defined by the third plate 40. Alignment of the apertures 50 with the corresponding ports 58 may allow for fluid flow through the second and third plates 38, 40, as described further herein. In some embodiments, the third plate 40 can include the annular projection 56 that extends about at least one of the plurality of ports 58. In various implementations, the turbine hub 28 includes at least one of (1) an annular projection 56 that extends about at least one of the plurality of apertures 50 defined by the second plate 38 and (2) an annular projection 56 that extends about at least one of the plurality of ports 58 defined by the third plate 40. The second and third plates 38, 40 may be projection welded to each other at the annular projection 56 of at least one of the second plate 38 and the third plate 40 in various embodiments, as described further herein.

Referring still to FIGS. 1-4, the third plate 40 is offset from the first plate 36 in a first axial direction 60 and the first plate 36 is offset from the third plate 40 in a second axial direction 62 that is opposite the first axial direction 60. As illustrated in FIG. 3, the third plate 40 includes an inboard axial portion 64 that extends in the second axial direction 62 to a radial portion 66 of the third plate 40 that extends radially outward from the inboard axial portion 64 to an outboard axial portion 68 of the third plate 40 that extends in the first axial direction 60 to a terminal end 70 thereof. As illustrated in FIG. 3, the terminal end 70 of the outboard axial portion 68 is in contact with the seal plate 30. In various implementations, the inboard axial portion 64 of the third plate 40 is non-rotatably connected to the seal plate 30, the radial portion 66 of the third plate 40 defines the plurality of ports 58, and the outboard axial portion 68 of the third plate 40 cooperates with the seal plate 30 to define a plurality of openings 72. As described further herein, pressurized fluid 74 may be arranged to flow away from the plurality of ports 58 toward the release chamber 34 in a torque converter mode of the torque converter 10.

As illustrated in FIG. 4, the inboard axial portion 64 includes an engagement interface 76 that is configured to non-rotatably engage the shaft 42. The engagement interface 76 includes a plurality of teeth that are configured to engage a corresponding plurality of teeth of the shaft 42. As illustrated in FIG. 3, a portion 78 of the radial portion 66 of the third plate 40 that is adjacent to the inboard axial portion 64 of the third plate 30 extends in the first axial direction 60 and radially outboard in an angling fashion from the inboard axial portion 64 of the third plate 30. This angled portion 78 of the third plate 30 may abut the plurality of ramped sections 54 of the second plate 38 in complementary fashion. The complementary abutment of the angled portion 78 of the third plate 30 and the ramped sections 54 of the second plate 38 may encourage fluid 74 flowing along a second flow path 88 to flow between the ramped sections 54 and radially outboard into the release chamber 34.

As illustrated in FIGS. 2-4, in some implementations, the third plate 30 may include an annular recess 80 for receiving a sealing element 82 that extends radially between the third plate 30 and the piston 22 of the lock-up clutch 20 of the torque converter 10. As illustrated, the annular recess 80 may be disposed proximate to the junction of the radial portion 66 of the third plate 30 and the outboard axial portion 68 of the third plate 30. The sealing element 82 disposed within the annular recess 80 may extend radially between the third plate 30 and the piston 22 such that the release chamber 34 is isolated from the apply chamber 32, as illustrated in FIG. 1.

Referring now to FIGS. 1-4, the turbine shell 26, first plate 36, second plate 38, third plate 40, and/or the seal plate 30 may be non-rotatably connected, in various embodiments. As illustrated in FIG. 3, the first plate 36 is welded to the second plate 38, and the first and second plates 36, 38 are welded to the turbine shell 26 at a first weld junction 84. In the illustrated embodiment, the turbine shell 26 and first plate 36 may be chamfered proximate the first weld junction 84 to allow for a suitable weld of the turbine shell 26, first plate 36, and second plate 38 at the first weld junction 84. As further illustrated in FIG. 3, the annular projection 56 that extends about the aperture 50 defined by the second plate 38 is projection welded to the radial portion 66 of the third plate 40 that defines the plurality of ports 58 extending therethrough. As further illustrated in FIG. 3, the seal plate 30 is welded to the inboard axial portion 64 of the third plate 30.

Figure 5:
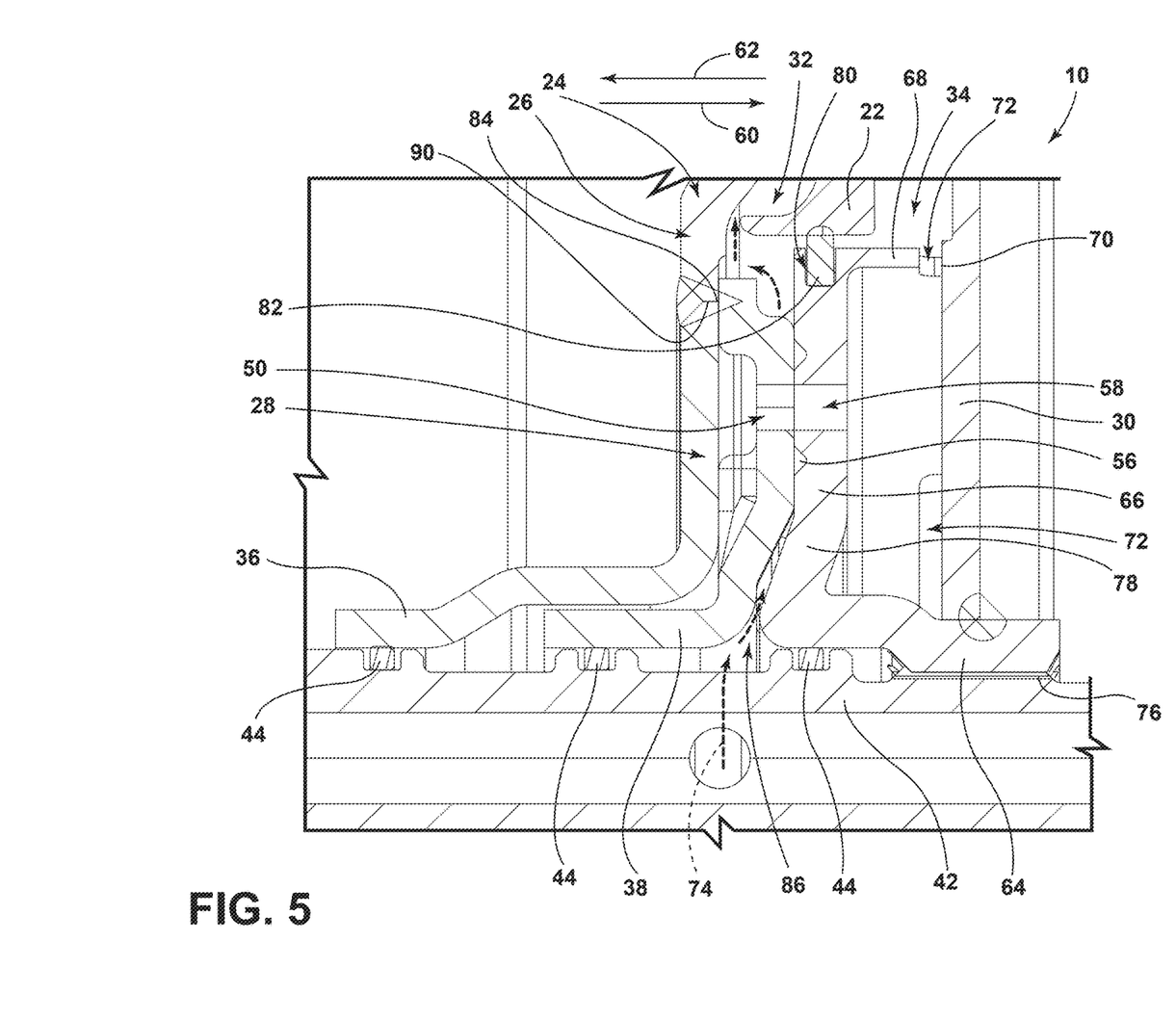
FIG. 5 is a partial cross-sectional view of a portion of a torque converter, illustrating a turbine hub that includes first, second, and third plates disposed on a shaft, and a first fluid flow path along which fluid is configured to flow between the second and third plates and into an apply chamber to apply force to a piston in a first axial direction, according to one embodiment.
Figure 6:
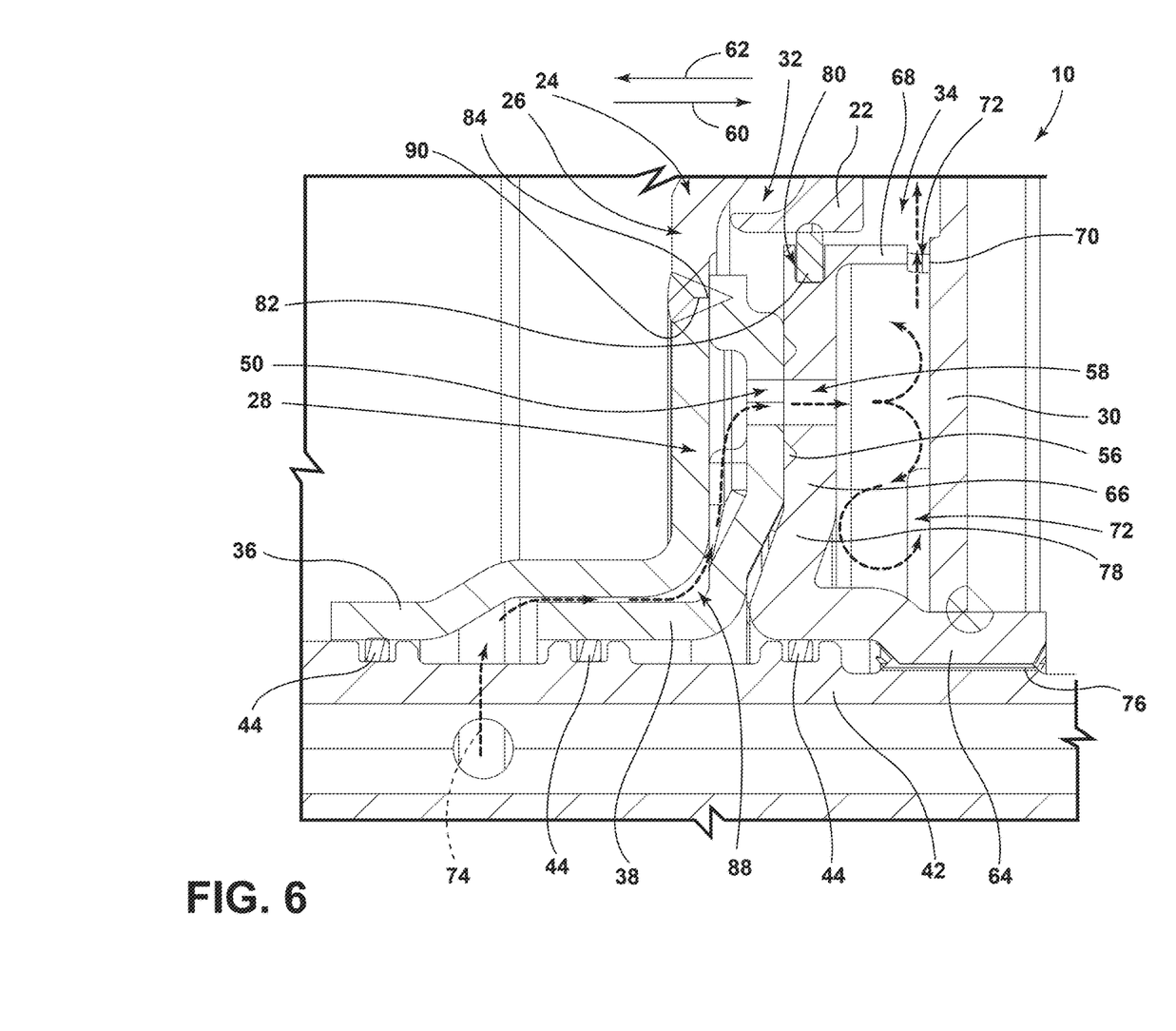
FIG. 6 is a partial cross-sectional view of a portion of a torque converter, illustrating a turbine hub having first, second, and third plates disposed on a shaft and a second flow path along which pressurized fluid is arranged to flow between the first and second plates, into a plurality of apertures defined by the second plate, into a corresponding plurality of ports defined by the third plate, and into a release chamber to apply force to a piston in a second axial direction, according to one embodiment.

Referring now to FIGS. 1, 5, and 6, the torque converter 10 is operable between a lock-up mode and a torque converter mode. In the lock-up mode of the torque converter 10, the piston 22 of the lock-up clutch 20 is non-rotatably connected to the cover 12 of the torque converter 10. In the torque converter mode, the cover 12 is rotatable with respect to the piston 22 relative to the axis 14. In operation of the torque converter 10 in the lock-up mode, pressurized fluid 74 is arranged to flow along a first flow path 86 between the second and third plates 38, 40 and into the apply chamber 32 to apply a force to the piston 22 in the first axial direction 60, as illustrated in FIG. 5. The fluid 74 may flow into the first flow path 86 from the shaft 42 about which the turbine hub 28 is disposed. In various implementations, the fluid 74 is configured to flow circumferentially between the ramped sections 54 of the second plate 38 as the fluid 74 flows axially outboard, and the projection weld at the annular projection 56 that extends around the aperture 50 and/or the port 58 seals the aperture 50 and port 58 from the first flow path 86.

In operation of the torque converter 10 in the torque converter mode, pressurized fluid 74 is arranged to flow along the second flow path 88 between the first and second plates 36, 38, into the plurality of apertures 50 defined by the second plate 38, into the corresponding plurality of ports 58 defined by the third plate 40, and into the release chamber 34 to apply a force to the piston 22 in the second axial direction 62 opposite the first axial direction 60 to disconnect the piston 22 from the cover 12, such that the cover 12 is rotatable with respect to the piston 22. The pressurized fluid 74 may enter the second flow path 88 from the shaft 42, in some implementations. In various implementations, fluid 74 that flows along the second flow path 88 through the aperture 50 defined by the second plate 38 and the port 58 defined by the third plate 40 flows away from the plurality of ports 58 and through the openings 72 that are cooperatively defined by the outboard axial portion 68 of the third plate 40 and the seal plate 30 toward the release chamber 34, as illustrated in FIG. 6.

In some implementations, the first, second, and third plates 36, 38, 40 of the turbine hub 28 may be stamped metal plates. As illustrated in FIG. 2, a thickness of the first plate 36 may be less than a thickness of the turbine shell 26 that is non-rotatably connected with the first plate 36. The first plate 36 may be formed to be relatively thin in this way to ensure adequate clearance between the first plate 36 and the second plate 38 to allow fluid 74 (oil) to flow between the first and second plates 36, 38 along the second flow path 88. As illustrated in FIG. 6, a radially-inboard terminal end 90 of the turbine shell 26 is thinner than portions of the turbine shell 26 that are radially outboard of the radially-inboard terminal end 90. The radially-inboard terminal end 90 of the turbine shell 26 having this thinner dimension may allow for the second plate 38 to flushly abut both the first plate 36 and the turbine shell 26 for the purpose of welding the turbine shell 26, first plate 36, and second plate 38 at the first weld junction 84.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS 10 torque converter
12 cover
14 axis
16 impeller
18 impeller shell
20 lock-up clutch
22 piston
24 turbine
26 turbine shell
28 turbine hub
30 seal plate
32 apply chamber
34 release chamber
36 first plate
38 second plate
40 third plate
42 shaft
44 seals
46 grooves
48 rivets
50 apertures
52 protruding portions
54 ramped sections
56 annular projection
58 ports
60 first axial direction
62 second axial direction
64 inboard axial portion
66 radial portion
68 outboard axial portion
70 terminal end
72 openings
74 fluid
76 engagement interface 78 angled portion
80 annular recess
82 sealing element
84 first weld junction
86 first flow path
88 second flow path
90 radially-inboard terminal end

What is claimed is:

1. A torque converter, comprising:
a cover arranged to receive torque for rotation about an axis;
an impeller non-rotatably connected to the cover;
a lock-up clutch including a piston;
a turbine that includes a turbine shell and a turbine hub, the turbine hub comprising:
a first plate to which the turbine shell is non-rotatably connected;
a second plate axially adjacent to the first plate and non-rotatably connected thereto, the second plate defining a plurality of apertures that are circumferentially offset from each other; and
a third plate non-rotatably connected to the second plate and positioned axially adjacent thereto, such that the second plate is positioned axially between the first and third plates, the third plate defining a plurality of ports that are circumferentially offset from each other and are aligned with the corresponding plurality of apertures defined by the second plate;
a seal plate that is non-rotatably connected with the third plate;
an apply chamber bounded at least in part by the piston; and
a release chamber bounded at least in part by the seal plate and the piston;
wherein, in a lock-up mode of the torque converter, in which the piston is non-rotatably connected to the cover, pressurized fluid is arranged to flow along a first flow path between the second and third plates and into the apply chamber to apply a force to the piston in a first axial direction; and
wherein, in a torque converter mode of the torque converter, in which the cover is rotatable with respect to the piston, pressurized fluid is arranged to flow along a second flow path between the first and second plates, into the plurality of apertures defined by the second plate, into the corresponding plurality of ports defined by the third plate, and into the release chamber to apply a force to the piston in a second axial direction opposite the first axial direction to disconnect the piston from the cover.

2. The torque converter of claim 1, wherein the turbine shell is welded to the first and second plates, and the first plate is welded to the second plate.

3. The torque converter of claim 1, wherein at least one of:
the second plate includes an annular projection that extends about at least one of the plurality of apertures defined by the second plate; and
the third plate includes an annular projection that extends about at least one of the plurality of ports defined by the third plate, wherein the second and third plates are projection welded to each other at the annular projection of at least one of the second plate and the third plate.

4. The torque converter of claim 1, wherein the third plate includes an inboard axial portion that extends in the second axial direction to a radial portion of the third plate that extends radially outboard from the inboard axial portion to an outboard axial portion of the third plate that extends in the first axial direction to the seal plate.

5. The torque converter of claim 4, wherein the inboard axial portion of the third plate is welded to the seal plate, the radial portion of the third plate defines the plurality of ports, and the outboard axial portion of the third plate cooperates with the seal plate to defines a plurality of openings through which the pressurized fluid flows away from the plurality of ports toward the release chamber in the torque converter mode of the torque converter.

6. The torque converter of claim 5, wherein the inboard axial portion includes an engagement interface that is configured to non-rotatably engage a shaft.

7. The torque converter of claim 6, wherein a sealing element extends radially between the third plate and the piston such that the release chamber is isolated from the apply chamber.

8. A turbine hub for a torque converter that is configured to rotate about an axis, comprising:
a first plate;
a second plate axially adjacent to the first plate and non-rotatably connected thereto, the second plate defining a plurality of apertures that are circumferentially offset from each other; and
a third plate non-rotatably connected to the second plate and positioned axially adjacent thereto, such that the second plate is positioned axially between the first and third plates, the third plate defining a plurality of ports that are circumferentially offset from each other and are aligned with the corresponding plurality of apertures defined by the second plate, wherein at least one of:
the second plate includes a projection that extends about at least one of the plurality of apertures defined by the second plate; and
the third plate includes a projection that extends about at least one of the plurality of ports defined by the third plate,
wherein the second and third plates are projection welded to each other at the projection of at least one of the second plate and the third plate.

9. The turbine hub of claim 8, wherein the first plate is welded to the second plate, and the first and second plates are configured to be welded to a turbine shell.

10. The turbine hub of claim 8, wherein the third plate includes an inboard axial portion that extends in a second axial direction to a radial portion of the third plate that extends radially outboard from the inboard axial portion to an outboard axial portion of the third plate that extends in a first axial direction to a seal plate.

11. The turbine hub of claim 10, wherein the inboard axial portion of the third plate is welded to the seal plate, the radial portion of the third plate defines the plurality of ports, and the outboard axial portion of the third plate cooperates with the seal plate to define a plurality of openings.

12. The turbine hub of claim 11, wherein the inboard axial portion includes an engagement interface that is configured to non-rotatably engage a shaft.

13. A torque converter, comprising:
a cover arranged to receive torque for rotation about an axis;
an impeller non-rotatably connected to the cover;
a lock-up clutch including a piston;
a turbine that includes a turbine shell and a turbine hub, the turbine hub comprising:
a first plate to which the turbine shell is non-rotatably connected;

a second plate axially adjacent to the first plate and non-rotatably connected thereto, the second plate defining a plurality of apertures that are circumferentially offset from each other; and a third plate non-rotatably connected to the second plate and positioned axially adjacent thereto, such that the second plate is positioned axially between the first and third plates, the third plate defining a plurality of ports that are circumferentially offset from each other and are aligned with the corresponding plurality of apertures defined by the second plate; and a seal plate that is non-rotatably connected with the third plate.

14. The torque converter of claim 13, wherein the turbine shell is welded to the first and second plates, and the first plate is welded to the second plate.

15. The torque converter of claim 14, wherein at least one of:

the second plate includes an annular projection that extends about at least one of the plurality of apertures defined by the second plate; and the third plate includes an annular projection that extends about at least one of the plurality of ports defined by the third plate, wherein the second and third plates are projection welded to each other at the annular projection of at least one of the second plate and the third plate.

16. The torque converter of claim 14, further comprising:
an apply chamber bounded at least in part by the piston; and a release chamber bounded at least in part by the seal plate and the piston;

wherein, in a lock-up mode of the torque converter, in which the piston is non-rotatably connected to the cover, pressurized fluid is arranged to flow along a first flow path between the second and third plates and into the apply chamber to apply a force to the piston in a first axial direction; and wherein, in a torque converter mode of the torque converter, in which the cover is rotatable with respect to the piston, pressurized fluid is arranged to flow along a second flow path between the first and second plates, into the plurality of apertures defined by the second plate, into the corresponding plurality of ports defined by the third plate, and into the release chamber to apply a force to the piston in a second axial direction opposite the first axial direction to disconnect the piston from the cover.

17. The torque converter of claim 16, wherein the third plate includes an inboard axial portion that extends in the second axial direction to a radial portion of the third plate that extends radially outboard from the inboard axial portion to an outboard axial portion of the third plate that extends in the first axial direction to the seal plate, and wherein the inboard axial portion of the third plate is welded to the seal plate, the radial portion of the third plate defines the plurality of ports, and the outboard axial portion of the third plate cooperates with the seal plate to defines a plurality of openings through which the pressurized fluid flows away from the plurality of ports toward the release chamber in the torque converter mode of the torque converter.

* * * * *